Nov. 14, 1944.  J. L. WILLIAMSON  2,362,787
METHOD OF FINISHING GEARS
Filed March 31, 1942  2 Sheets-Sheet 1

Inventor
James L. Williamson
by Wright, Brown
Quimby & Nay
Attys.

Nov. 14, 1944.  J. L. WILLIAMSON  2,362,787
METHOD OF FINISHING GEARS
Filed March 31, 1942  2 Sheets-Sheet 2

Inventor
James L. Williamson
by Wright, Brown, Quinby
& Seay
Attys.

Patented Nov. 14, 1944

2,362,787

UNITED STATES PATENT OFFICE 2,362,787

METHOD OF FINISHING GEARS

James L. Williamson, Springfield, Vt., assignor to The Fellows Gear Shaper Company, Springfield, Vt., a corporation of Vermont Application March 31, 1942, Serial No. 436,940

7 Claims. (Cl. 90—1.6)

The present invention relates to procedures of finishing gears which have previously been cut to an approximation of their final dimensions and tooth face curvatures by means of tools which are themselves of gear form with teeth of which the face curves and dimensions are conjugate, with a high quality of accuracy, to the prescribed finished form and dimensions of the gears on which they are designed to be used. In the finishing operation, the tool and gear being finished are run in mesh together with no other control of their relative velocities than is afforded by engagement of their intermeshing teeth. That is, either the tool or the work piece (generally the tool) is mounted on a positively driven spindle and rotated thereby at a definite velocity, serving as the driver, and the other member of the pair is supported with freedom to rotate at whatever speed may be imparted by the driving member.

The lack of speed ratio control by means of gearing between the tool spindle and work spindle, such as is provided in gear generating machines, for instance, makes the finishing action liable to errors and defects due to insufficient control, particularly when the work piece is so small that only a few of its teeth make simultaneous contact with the teeth of the tool.

Finishing treatments of the class referred to include shaving, lapping and burnishing, but the difficulties of control are particularly marked in the shaving procedure because of the capacity of shaving tools to remove stock from the work piece by a cutting or scraping action. Shaving tools are characterized by grooves or gashes in the sides and, in some cases, across the tops or crests of the teeth, between their ends, of which the bounding edges in the tooth faces are cutting edges. It is with reference to the use of tools of this category particularly that I have developed the present invention, wherefore in the following description I shall generally refer to the procedure embodying the invention as shaving, and to the tools used therefor as shaving tools, but without intending thereby to exclude from the scope of protection here claimed procedure and tools of the other categories above referred to, or analogous tools which are adapted to be used in the manner herein described.

One object of the invention is to afford a better speed ratio control of the driven member of the pair, composed of such a tool and a work piece, by causing engagement between the tool and the work piece to occur at a larger number of simultaneous points, at all times, than the contact points of normal gear action; that is, engagement not only on the lines of action of the intermeshing teeth, but also at points additional to those lying on the lines of action. Another object is to effect shaving of the root portions and fillets of the teeth (and, if desired, of the root circumference between the teeth also), as well as of the tooth flanks.

The invention comprises the method of finishing gears with control of the rotation imparted to the gear by the tool, or to the tool by the gear, through the action of an excess addendum, or addendum extensions, on the teeth of the tool, suitably formed and disposed to effect contact between mating teeth of tool and work at points additional to the contact points lying on the lines of action, and which extend the arc of action beyond the lines of normal or involute tooth action. It further includes all substantial equivalents of the specific method and mode of action precedently set forth and hereinafter described in detail. It comprises in addition the shaving of areas within the base circle of certain gears. For the purposes of this specification, the parts of gear teeth between the pitch circle and root circumference are considered and designated as the tooth roots or root portions.

In the drawings furnished herewith—

Figure 1:
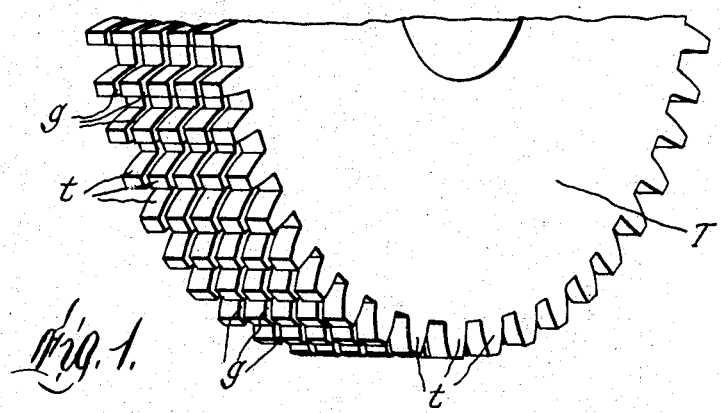
Fig. 1 is a perspective view of part of a standard gear shaving tool to illustrate the type of tool to which the invention relates.

Referring to the drawings, Fig. 1 shows a shaving tool T of the character heretofore used. Such tools possess teeth $t$ like standard gear teeth except that they are made of alloys suitable for metal cutting tools and their faces are interrupted by grooves or gashes $g$, the bounding edges of which in the side faces of the teeth are sharp and adapted to serve as cutting edges, whereby chips are removed from the faces of the work gear when the tool and gear run in mesh in a manner to cause a sufficient pressure and a relative lengthwise travel between mating teeth. In some cases the grooves or gashes extend entirely through the teeth and in others are cut partly through from opposite sides; in some the grooves are sunk in planes normal to the tooth faces, and in others are more or less inclined to such normal planes; in some the grooves and edges are oblique to the length of the teeth; and in some tools the spaces between cutting edges are provided by making the tools of distinct units assembled together on a hub or arbor with corresponding teeth in an alinement corresponding to the positions of successive portions of uninterrupted gear teeth. My invention is applicable to shaving tools having grooves and cutting edges in any suitable arrangement produced in any suitable way.

Figure 2:
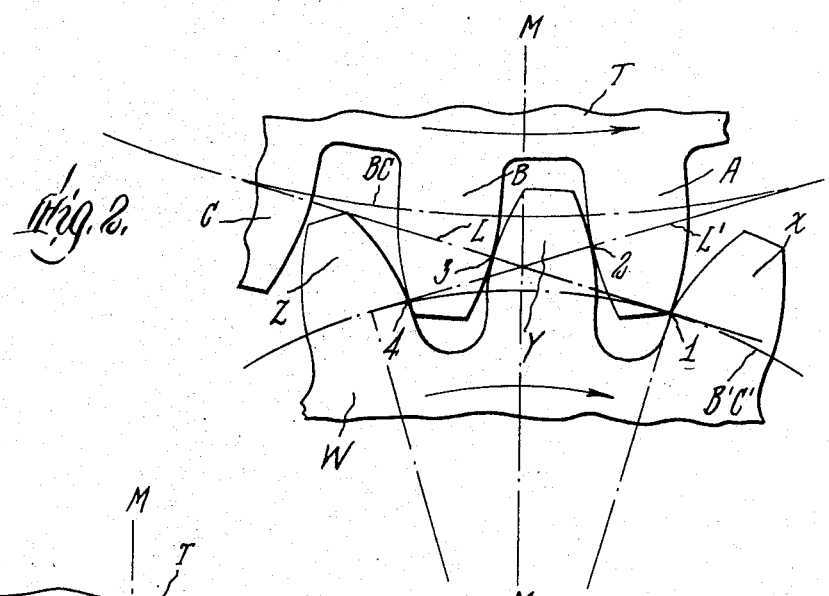
Figs. 2 and 3 are views on an enlarged scale of the meshing teeth of such a tool and the work gear in two stages of their progressive action.
Figure 3:
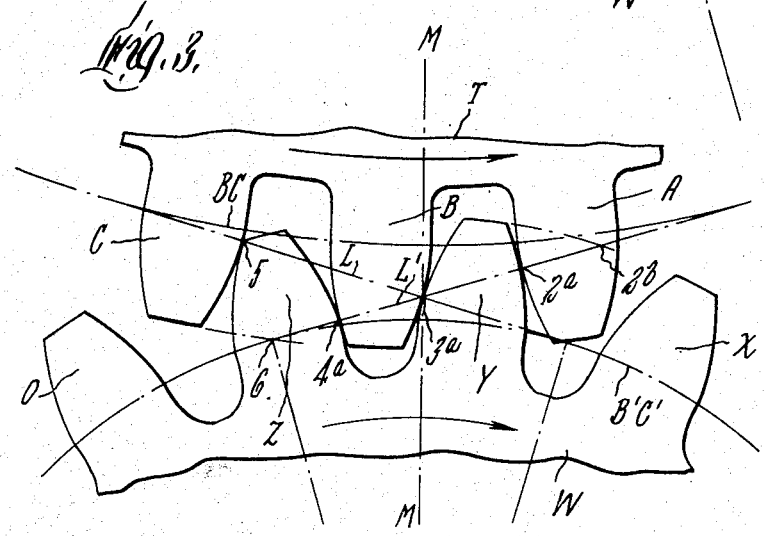

When tools of the character heretofore used, which I call standard tools to distinguish from tools containing my invention, are run in mesh with work gears of small diameters, their mating teeth engage one another only at a few points of simultaneous contact, all of which are located along the lines of action. This is illustrated by Figs. 2 and 3, where the meshing teeth, and next adjacent teeth, of a standard tool T and a work gear W are shown. The teeth here represented are of involute form, which is the form generally, if not universally, given to gears and gear finishing tools at the present time. The curved line B—C represents the base circle of the tool, and the curved line B'—C' represents the base circle of the work gear. The straight lines L and L', tangent to the two base circles and crossing the line of centers M—M, represent the lines of action of the mating teeth. The intersection of the lines of action is the pitch point of the tool and gear. Their pitch circles, not here shown, are circles concentric with their respective axes passing through the pitch point.

Standard tools are designed in accordance with the principles employed in designing gears so that they will be conjugate to the respective gears to be finished by them. Their action in driving a work gear (or in being driven by the work gear) is purely involute or normal action, and their mating teeth come into, and leave, mesh within the limits of the lines of action. In the great majority of cases, the number of simultaneous points of contact is narrowly limited. In the case here illustrated, there are at most only four points of contact, and at times only three. In the position of Fig. 2 contact occurs between the tooth A of the tool and the tooth X of the work at the point 1; between tooth A and tooth Y at the point 2; between tooth B and tooth Y at the point 3; and between tooth B and tooth Z at the point 4. Assuming that the tool and gear are rotating in the direction of the arrows, point 1 is at the end of the arc of action, so that progression beyond the position shown in Fig. 2 interrupts the contact there, leaving three points of contact until tooth Z of the work and C of the tool come into engagement at the point 5 shown in Fig. 3; the points 2, 3 and 4 having then shifted along the lines of action to the positions 2a, 3a and 4a, shown in the latter figure. Similarly the tooth A separates from tooth Y at point 2b before the tooth O of the work gear makes contact with tooth C of the tool at location 6.

With so few points in contact, and with such a large percentage of variation between the number of contacting points at frequently repeated intervals during the running of the gears, the action is not sufficiently smooth and uniform to obtain the desired approach to perfection in the results achieved in finishing gears. Errors appear in finished gears which cannot be avoided or removed by the utmost perfection in the tool.

Figure 4:
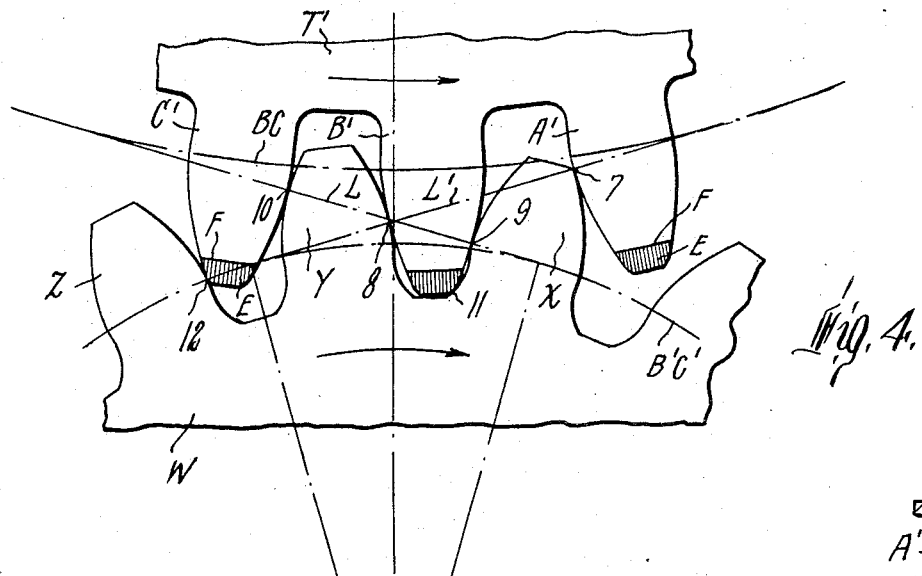
Figs. 4, 5 and 6 are similar views of a tool embodying this invention in three stages of meshing action with the work piece.
Figure 5:
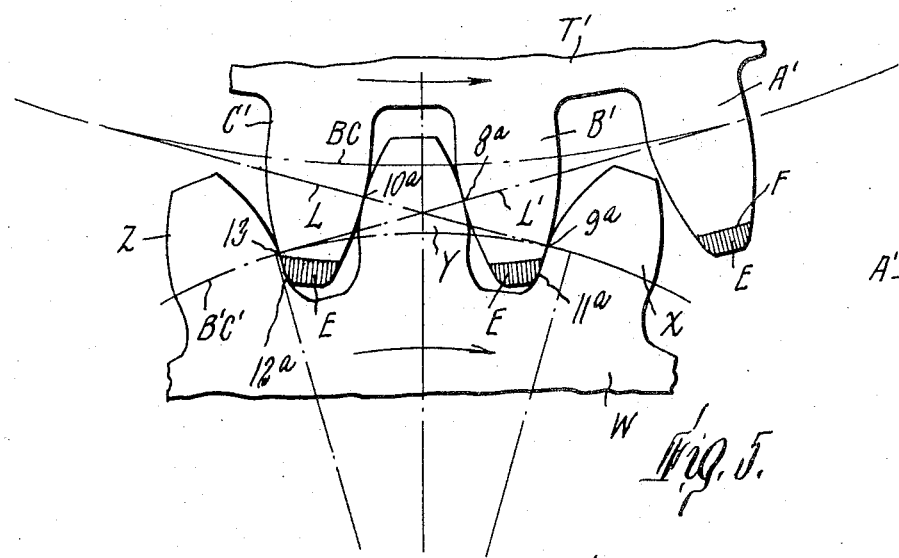
Figure 6:
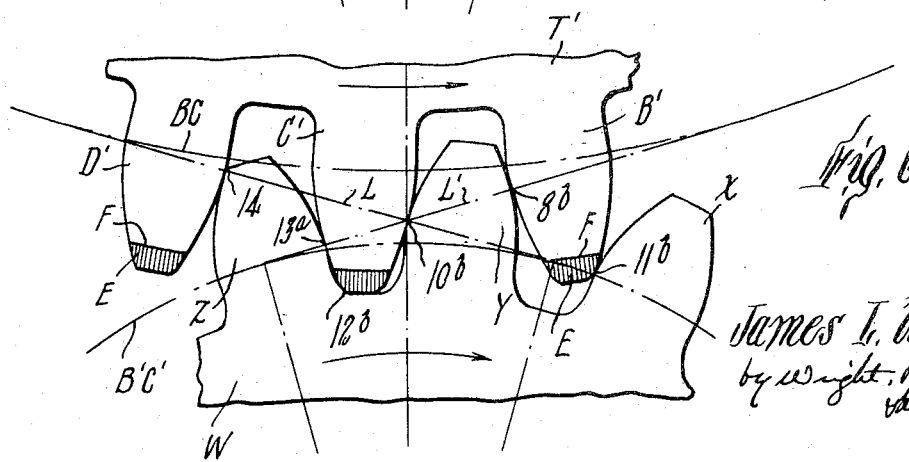

I have approached the problem of avoiding such errors from a new angle and have solved it by making tools with tooth addenda of such length and face curvature as to make contact with the work at a greater number of points than is possible with otherwise comparable standard tools. A fragment of a tool T' embodying my invention, but otherwise like the standard tool above described, in diameter, pitch and pressure angle, and having cutting edges in the sides and extending across the tops or crests, of its teeth, is shown in Figs. 4, 5 and 6 in action upon a work gear W like that shown in the preceding figures. The same reference characters as in Figs. 2 and 3, or related characters, are used in Figs. 4, 5 and 6 to designate the same or corresponding parts and lines.

The particular in which the teeth of this tool differ from those of the standard tool for acting on the same gears, is that they have addendum extensions represented by the shaded areas E in Figs. 4, 5 and 6. Otherwise they are identical. By the commonly accepted definition, the addendum of a gear tooth is that part of the tooth which extends outside of the pitch circle. This same definition applies to gear finishing tools of the character involved herein. The line F on the teeth of my novel tool represents the addendum limit of the corresponding standard tool, and is at the same distance from the center as the tooth extremities of tool T from the axis of that tool. The extremities of the teeth beyond that line are the addendum extensions of this invention. These addendum extensions produce additional points of contact.

With the tool and work in the position shown in Fig. 4, and assumed to be rotating as indicated by the arrows, contact is made at points 7 and 8 on the line of action L' and at points 9 and 10 on the line of action L. In addition there are two other points of contact, namely, at 11 between the extension of tooth B' and the root of gear tooth X, and at 12 between the extension of tooth C' and tooth Z in advance of the beginning point of the line of action L'. In rotating to the position shown in Fig. 5, contact is broken at the point 7, the other points shift to new positions designated at 8a, 9a, 10a, 11a and 12a, and a new point of contact is established at 13 between the teeth C' and Z. Rotating further, to the relation shown in Fig. 6, the contact at 9a is discontinued, the five other points are shifted to new locations, 11b, 8b, 10b, 12b and 13a, of which the location 11b is beyond the end of line of action L, and another contact is established at the point 14 between the teeth D and Z. As the rotation proceeds further, the teeth C' and Y come into engagement at two points, like the engagement between teeth B' and X shown in Fig. 4, directly after contact at 11b is lost; and thereafter, while the two point contact between C' and Y persists, the work gear tooth next following tooth Z engages the extension of the tool tooth D in a manner similar to the way the teeth C' and Z are engaged in Fig. 4.

At times, and most of the time, there are six points of contact, and at no time are there less than five, with the improved tool; as compared with four and three points, respectively, in the case of the otherwise similar standard tool. Although with tools and work gears of other diametral pitches and other pressure angles than those represented in Figs. 2 and 3, the maximum number of contact points may be more or less than in this example, yet the same general comparison holds between a tool of my invention for finishing any class of gears and the standard tool adapted to finish gears of the same class. In all cases my tool has a substantially larger number of points in simultaneous contact with the work piece than the standard tool at all times, and the arc of action is longer.

A further important feature is that at least one tooth of the tool makes contact with one of the teeth of the work gear at two points simultaneously most of the time and two teeth of each make two-point contact part of the time. Two-point contact begins between each tooth of the tool and the next following work gear tooth with the beginning of normal contact on the line of action, as illustrated with respect to the teeth C' and Z in Fig. 5, and continues until the tool tooth closely approaches the line of centers (somewhat beyond the position shown in Fig. 6). Then, immediately after passing the line of centers, the same tool tooth shifts into two-point contact with the work gear tooth next ahead, substantially as shown in Fig. 4 with respect to the teeth B' and X, and continues thus until normal contact ceases at the end of the line of action. Contact of each following tooth pair at two points begins before the two-point contact of the preceding pair ends. This manner of contact aids greatly in controlling the rotation of the driven member.

Figure 7:
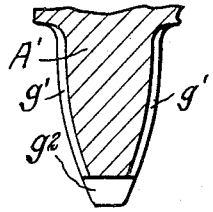
Fig. 7 is a cross section of one of the teeth of such a tool.
Figure 8:
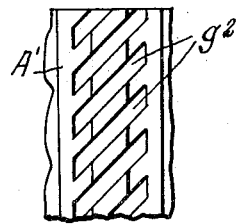
Fig. 8 is a radial view of a tool tooth further illustrating one phase of the invention.

The addendum extensions also shave or cut the root portions and fillets of the work gear teeth and may be made long enough to shave the bottoms of the interdental spaces likewise. They are here shown as long enough to act on the bottoms of the spaces, but may be only long enough to act on the roots and fillets. The forms of the invention designed for shaving have grooves and cutting edges intermediate their ends, which grooves and edges extend across the crests of the teeth of those tools which are designed for shaving the circumference of a gear between the tooth roots. The grooves in the tool teeth may be cut all the way through them from crest to root, in the same way as shown in Fig. 1, or they may be relatively shallow grooves, such as the grooves $g'$ in the sides and the grooves $g^2$ across the crest, as represented in Fig. 7. The grooves $g^2$ in the crest may extend squarely across the teeth or be inclined at an acute angle thereto, as shown in Fig. 8. The inclined arrangement is more particularly useful with tools designed to be run in parallel axis mesh with the work pieces, although it may be employed also in tools adapted for crossed-axis mesh.

Tools of this invention may have shaving grooves only across the crests and in the outer regions of the side faces, for shaving the roots and fillets only of gear teeth, or the roots, fillets and bottoms of the tooth spaces, without shaving the remaining portions of the teeth. For that purpose also the two-point engagement previously described is important in that it controls accurately the shaping of the fillets.

A formation is given the sides of the addendum extension which is conjugate to the prescribed form of the tooth root fillets of the finished gear. Gears are initially cut with abundant clearance at the bottoms of their tooth spaces, and the addendum extensions of this invention are as long as required for the purposes last described. Their corners are preferably modified from the involute curvature of the balance of the tooth to avoid excessive pressure or blocking and undercutting. In other words, the tooth extremities or corners are modified by such departure from the involute curve as will permit good cutting action along the lines of action while at the same time affording the additional points of support previously described. But it must be understood that the invention is not limited to a modified formation at these points, but embraces all embodiments of the principles herein described where contact with the tooth roots is obtained at the same time with lateral contact at points on the lines of action.

I wish to emphasize further that the invention is applicable to tools having teeth of other forms than involute, to those having helical teeth as well as spur teeth, and to those of internal as well as external gear character. It is not limited to tools made of metal, but may be applied to abrading tools or hones made of agglomerated grains of hard minerals, and to non-metallic, as well as metallic, tools adapted to be used as laps. In connection with all tools used in circumstances where the only control of the work gear is afforded by its meshing relationship with the tool (or, conversely, the rotation of the tool is controlled by the work gear), the extra points of support stabilize the cutting action.

What I claim and desire to secure by Letters Patent is:

1. In the method of finishing gears by running the work gear in mesh with a gear-like finishing tool where one of the gear elements consisting of the tool and gear is rotated by power and drives the other element by the action of their respective intermeshing teeth, the new step which comprises employing a tool having addendum extensions on its teeth which engage the work gear simultaneously both at points lying on the lines of action and at points on the work gear within the base circle of the tooth face curves of the gear.

2. The method of gear finishing which comprises meshing a work gear with a gear-like finishing tool having addendum extensions formed to make contact with the teeth of the work gear at points within the base circle of the gear while the tool teeth engage with work gear teeth at points on the lines of action, and causing one of the elements constituted by the tool and gear to impart rotation to the other by its intermeshing teeth.

3. The method of gear finishing which comprises meshing a work gear with a gear-like finishing tool, one of the elements constituted by the gear and tool having addendum extensions disposed to make contact with the other beyond the tangent points of the lines of action with the base circle of such other element, and also to make contact with portions of such teeth within the base circle while the intermeshing teeth are in contact at points on the lines of action, and causing one of said elements to drive the other by intermeshing tooth action.

4. The method of gear finishing which comprises meshing a work gear with a gear-like tool having tooth forms conjugate to the prescribed finished form of the gear teeth, imparting rotation to one of the elements constituted by the tool and gear, the other element being free to be rotated by the element to which rotation is so imparted, and controlling the rotation of the driven element by addendum extensions on the teeth of one of said elements which are formed to make contact with meshing teeth at points away from the lines of action while the meshing teeth make contact with each other on the lines of action.

5. The method of gear finishing which comprises meshing a work gear, of which the teeth have involute outer face portions and non-involute inner portions, with a gear-finishing tool of master gear formation having teeth conjugate to the forms prescribed for the teeth of the gear to be finished, and having addenda extending beyond the addendum limits of the standard tool for finishing the same gear, rotating one of the elements constituted by the tool and gear, whereby the other element is driven by intermeshing tooth action, and causing the addendum extensions of the tool teeth to engage non-involute portions of the work gear teeth while other portions of the tool teeth engage the work gear teeth on the lines of action.

6. The method of finishing to prescribed face form the teeth of a partially finished gear, which comprises meshing with such gear a tool of gear characteristics having teeth with side faces conjugate to the curves prescribed for the finished gear, one of the elements constituted by the tool and gear having addendum extensions on its teeth adapted to engage the portions of the teeth of the other element away from the after-mentioned lines of action while the intermeshing teeth are in contact on lines of action tangent to the base circles of the elements, and rotating said elements while in mesh.

7. The method of finishing to prescribed form the tooth faces of a partially finished gear, which comprises running such gear in mesh with a gear-like finishing tool having teeth with face curves conjugate to those of the gear, the tool and gear being meshed under pressure without backlash and one of them having addendum extensions on its teeth disposed to make contact with the teeth of the other at points away from the lines of action while the intermeshing teeth are in contact on the lines of action.

JAMES L. WILLIAMSON.